Nov. 1, 1927.

J. C. FOX

SIRUPING-OFF PAN

Filed Sept. 16, 1926

1,647,908

WITNESSES:

INVENTOR,
JOHN C. FOX.
BY
ATTORNEYS.

Patented Nov. 1, 1927.

1,647,908

UNITED STATES PATENT OFFICE.

JOHN C. FOX, OF RUTLAND, VERMONT.

SIRUPING-OFF PAN.

Application filed September 16, 1926. Serial No. 135,865.

This invention relates to siruping-off means to be incorporated in an evaporator used in the manufacture of maple sirup; a type of evaporator such as is disclosed in United States Letters Patent No. 1,159,213.

In accordance with the present invention, a boiling or evaporator pan of special construction is associated with other pans of usual construction; the association of the pans being such that they communicate with each other to permit the regulation of flow of sap through the pans reversibly, or in other words alternately in opposite directions so as to remove malate of lime, sometimes called sugar sand deposited on wall portions of the pans in the production of the maple sirup. It has been found that when the sap is allowed to flow through the pans of an evaporator, malate of lime in the sap is deposited on the walls of the pan from which the sirup is drawn, due to the fact that in the boiling of the sap and as it thickens in the production of the sirup, the said malate of lime adheres to the walls which must be removed in order to produce a superior grade of maple sirup of the proper color and flavor. It has been found that by reversing the flow of sap after each day's use of the evaporator, the fresh cold sap due to its comparatively great fluidity, will remove the deposited malate of lime in passing through the pans in a reverse direction from that in which it was permitted to flow the day before. It is therefore the principal object of the present invention to provide a siruping-off means by virtue of which malate of lime will be eliminated by the very act of reversibly introducing sap into and withdrawing the sirup from the boiling pans of an evaporator.

Another object of the invention is the provision of a siruping-off pan of special construction which may be arranged between other boiling or evaporator pans which will cause the sap to flow in a proper manner for obtaining the mentioned results looked for.

The nature of the invention and its distinguishing features and advantages will appear when the following specification is read in connection with the accompanying drawing, in which—

Figure 1:
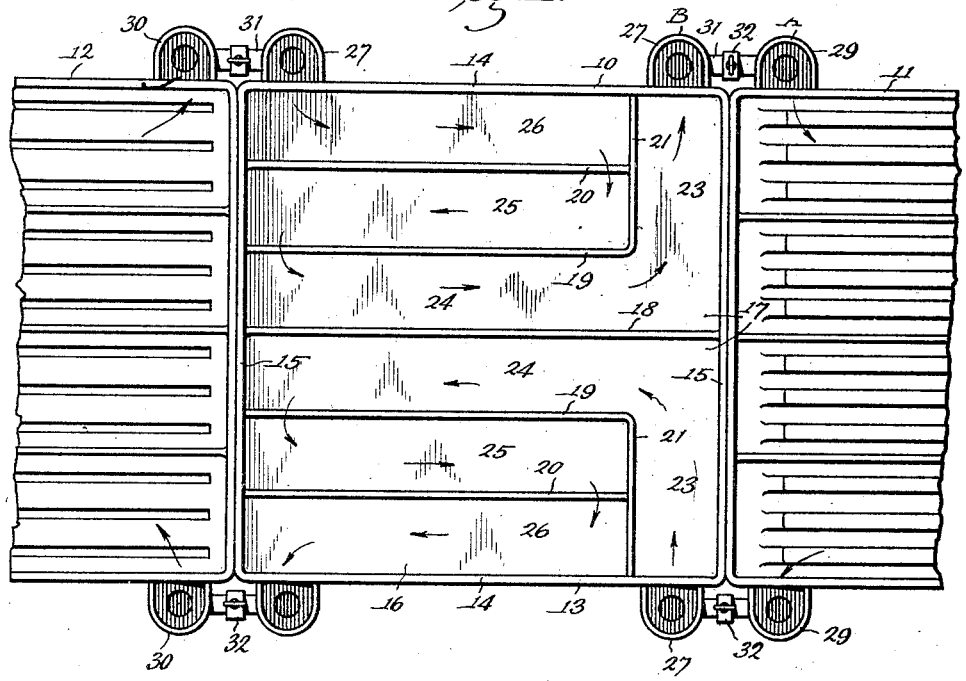
Figure 1 is a plan view of several pans including the pan of the present invention which is arranged between two pans of well known construction, a portion of each of the latter pans being shown.
Figure 2:
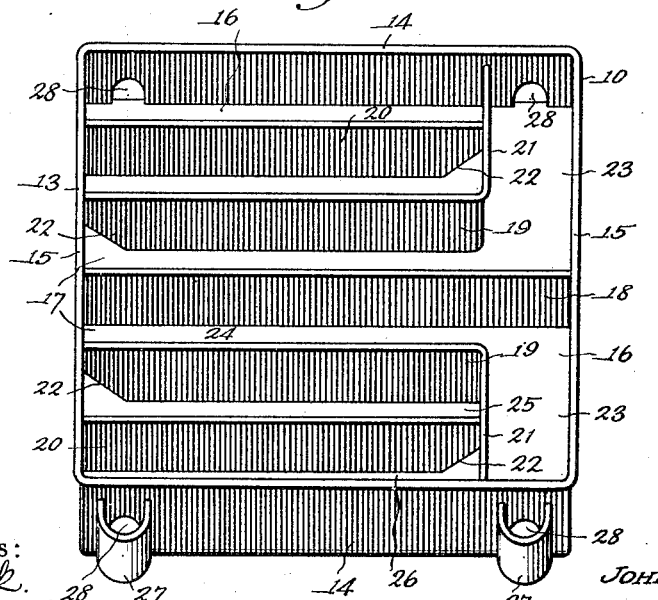
Fig. 2 is a perspective view of the pan of the present invention.

Referring now to Fig. 1 of the drawing, it will be apparent that there is illustrated a pan 10 which embodies the present invention and pans 11 and 12. The pans 10, 11 and 12 are in communication with each other by means to be hereinafter described so that the sap may flow through all of the pans in the production of the maple sirup and sugar.

Referring now more particularly to the pan 10 it will be apparent that the same consists of a pan body 13 having sides 14, ends 15 and a bottom 16. The pan body 10 is divided into two compartments 17 by virtue of a longitudinal partition or dividing wall 18 which is arranged centrally of the pan body and has the opposite ends thereof connected respectively to the ends 15, and is also connected to the bottom 16. Each of the compartments 17 has an arrangement of longitudinal walls 19 and 20 arranged in spaced relationship, and a transverse wall 21 extending from one end of the wall 19 to the related side wall 14 of the pan body. Each of the walls 19 and 20 is less than the distance between the end walls 15, and each of the walls 19 and 20 is cut off as at 22. Each wall 20 is cut off adjacent its related transverse wall 21, whereas each wall 19 is cut off adjacent the related end wall 15 of the pan body. The arrangement of all of the walls including the sides, ends and bottom of the pan 13 is such as to provide a tortuous passageway in each of the compartments 17. Said passageway in each of the compartments 17 consists of branches 23, 24, 25 and 26. Each of the sides 14 of the pan body has connected thereto near the opposite ends thereof respectively cups 27 which communicate with the related compartment 17, and therefore the tortuous passageway formed therein, by virtue of openings 28 in the related side 14.

The pan 11 hereinbefore referred to is of well known fluted or corrugated construction, and a detailed description of the same is not necessary except that it is to be understood that the pan 11 includes cups 29 which are similar to the cups 27. The pan 12 hereinbefore referred to is also of well known fluted or corrugated construction and also includes cups 30 similar to the cups 27.

The cups 27, 29 and 30 are connected together in pairs as shown most clearly in Fig. 1 by a suitable pipe connection 31, certain or all of which may be provided with a suitable cut-off valve 32.

The pan 10 is the siruping-off pan, so-called, because the sirup produced from the fresh sap is continuously drawn off from one side or the other of the pan. In the production of the sirup, the flow of the fresh sap and the resulting sirup is continuous. The pans 11 and 12 are mainly relied on, because of their greater heating surfaces, produced by the usual flutings or corrugations, for heating the sap to produce the sirup. Since the sirup produced is much thicker in consistency than the fresh sap, and because the comparatively thick sirup is drawn off from the pan 10, the deposits or accumulations on the walls and partitions of pan 10 will be greatest at the end of the day. The pan 10 with its flat bottom and arrangement of walls and partitions, will cause a restricted and therefore an accelerated flow. When the fresh sap is first introduced this restricted and accelerated flow will cause a cleaning action on the walls and partitions of pan 10 causing deposits or accumulations thereon to be removed. It is to be understood that either one of the cups 27 of the pan 10 may be used for introducing the fresh sap, and for drawing off the resulting sirup. It is also to be understood that the several pans 10, 11 and 12 will be subjected to substantially the same uniform intensity of heat.

From the foregoing it will be apparent that if sap is introduced in one of the cups 29 of the pan 11, for instance, the cup designated A, with the related valve 32 closed and all of the other valves open, the sap will pass through the pan 11, through the cup 29 at the opposite side, then through the related cup 27 to the branch 23 of the tortuous passage, then through the branches 24, 25 and 26, in the order mentioned, then through the associated cups 27 and 30, into and through the pan 12 to the opposite side thereof through the other cups 30 and 27 into and through the passageway formed in the other compartment 17, and finally out through the cup designated B, as indicated by the arrows. The following day the sap may be introduced through the cup designated C, and the resulting sirup will be drawn off from the cup designated D, therefore reversing the flow, which will result in the removal of the malate of lime deposited by virtue of the action of the comparatively restricted and accelerated flow of the fresh sap on the walls which will be thickest on those walls first encountered by the fresh sap. In this way the malate of lime is removed from the walls and is carried off in the sirup produced from which it may be readily removed in the form of sediment. It will therefore be understood that the walls of the pan from which the produced sirup is drawn off will be kept clean, and will not require the removal of the pan, as is now the case, for scraping or having applied thereto certain acids for the removal of the malate of lime.

I claim:

1. In siruping-off apparatus, several evaporator pans arranged end to end, one of said pans being the siruping-off pan and arranged between the other pans, the siruping-off pan including walls dividing the pan into two separate compartments, and each compartment having a tortuous passage; and means establishing communication between the opposite ends of each tortuous passage and the interiors of the other pans respectively.

2. A siruping-off pan consisting of a flat bottom, side and end walls, a central partition wall extending between said end walls and dividing the pan into two separate compartments, and a tortuous passage formed in each of said compartments, the opposite ends of the tortuous passage in each compartment respectively opening through the opposite ends of the related side wall of the pan.

JOHN CRARY FOX.